(12) United States Patent
Singer et al.

(10) Patent No.: US 10,073,256 B2
(45) Date of Patent: Sep. 11, 2018

(54) DEVICE FOR IMAGING SAMPLE (71) Applicants: Carl Zeiss Microscopy GmbH, Jena (DE); Carl Zeiss AG, Oberkochen (DE)

(72) Inventors: Wolfgang Singer, Aalen (DE); Ralf Wolleschensky, Jena (DE); Wilhelm Ulrich, Aalen (DE); David Shafer, Fairfield, CT (US); Artur Degen, Jena (DE)

(73) Assignees: CARL ZEISS MICROSCOPY GMBH, Jena (DE); CARL ZEISS AG, Oberkochen (DE)

( * ) Notice: Subject to any disclaimer, the term of this patent is extended or adjusted under 35 U.S.C. 154(b) by 52 days.

(21) Appl. No.: 14/894,029

(22) PCT Filed: May 27, 2014

(86) PCT No.: PCT/EP2014/060891
§ 371 (c)(1),
(2) Date: Nov. 25, 2015

(87) PCT Pub. No.: WO2014/191381
PCT Pub. Date: Dec. 4, 2014

(65) Prior Publication Data
US 2016/0131884 A1    May 12, 2016

(30) Foreign Application Priority Data
May 30, 2013   (DE) .................. 10 2013 105 586

(51) Int. Cl.
*G02B 21/06*   (2006.01)
*G02B 21/00*   (2006.01)
(Continued)

(52) U.S. Cl.
CPC ............. *G02B 21/04* (2013.01); *G02B 13/22* (2013.01); *G02B 17/084* (2013.01);
(Continued)

(58) Field of Classification Search
CPC ................ G02B 21/00; G02B 21/0004; G02B 21/0016; G02B 21/0032; G02B 21/02;
(Continued)

(56) References Cited

U.S. PATENT DOCUMENTS 5,715,081 A     2/1998  Chastang et al.
6,927,852 B2 *  8/2005  Reel .......................... G01J 3/02
                                                                356/317
(Continued)

FOREIGN PATENT DOCUMENTS

DE              10257423       6/2004
DE         10 2011 000 835     8/2012
(Continued)

OTHER PUBLICATIONS

International Search Report for Application No. PCT/EP2014/060891 dated Jul. 30, 2014.
(Continued)

*Primary Examiner* — Thong Nguyen
(74) *Attorney, Agent, or Firm* — Haug Partners LLP (57) ABSTRACT

An apparatus for imaging a sample arranged in a first medium in an object plane. The apparatus includes an optical transmission system which images the sample in the object plane in an intermediate image in an intermediate image plane. The object plane and the intermediate image plane form an angle not equal to 90° with an optical axis of the transmission system. The apparatus further comprises an optical imaging system having an objective. The object plane may be imaged on a detector without distortion. The optical transmission system is symmetrical with respect to a pupil plane, the object plane, and the intermediate image plane to satisfy the Scheimpflug condition. The intermediate image lies in a second medium having a refractive index virtually identical to that of the first medium. A lens group
(Continued)

of a subsystem arranged closest to the sample or intermediate image comprises at least one catadioptric assembly.

12 Claims, 4 Drawing Sheets (51) Int. Cl.
G02B 21/04 (2006.01)
G02B 13/22 (2006.01)
G02B 17/08 (2006.01)
G02B 21/36 (2006.01)
G02B 21/33 (2006.01)

(52) U.S. Cl.
CPC ..... G02B 17/0808 (2013.01); G02B 17/0856 (2013.01); G02B 17/0896 (2013.01); G02B 21/0076 (2013.01); G02B 21/06 (2013.01); G02B 21/33 (2013.01); G02B 21/367 (2013.01)

(58) Field of Classification Search
CPC .... G02B 21/06; G02B 21/242; G02B 21/248; G02B 21/33; G02B 21/361; G02B 17/00; G02B 17/08; G02B 17/084; G02B 17/0856; G02B 21/04; G02B 21/0076; G02B 21/367
See application file for complete search history.

(56) References Cited

U.S. PATENT DOCUMENTS

| 7,030,965 | B2* | 4/2006 | Takahashi | G02B 17/0844 355/67 |
|---|---|---|---|---|
| 2003/0027367 | A1* | 2/2003 | Watkins | G01N 21/9501 438/16 |
| 2003/0058432 | A1 | 3/2003 | Drake | |
| 2004/0201852 | A1* | 10/2004 | Hill | G02B 21/0024 356/511 |
| 2004/0240047 | A1 | 12/2004 | Shafer et al. | |
| 2005/0107675 | A1* | 5/2005 | Tokuda | A61L 31/048 600/310 |
| 2007/0086919 | A1* | 4/2007 | Akcakir | B82Y 20/00 422/82.05 |
| 2007/0109633 | A1 | 5/2007 | Stelzer | |
| 2011/0261446 | A1 | 10/2011 | Dunsby | |
| 2013/0335818 | A1 | 12/2013 | Kriebel et al. | |
| 2014/0042339 | A1 | 2/2014 | Stelzer et al. | |
| 2015/0168732 | A1 | 6/2015 | Singer et al. | |
| 2015/0309294 | A1 | 10/2015 | Stelzer | |

FOREIGN PATENT DOCUMENTS

| DE | 10 2012 013 163 | 4/2014 |
| WO | WO 2004/053558 | 6/2004 |
| WO | WO 2008/078083 | 7/2008 |

OTHER PUBLICATIONS

Notification of Transmittal of Copies of Translation of the International Preliminary Report on Patentability dated Dec. 1, 2015.

Tokunaga et al., "Highly inclined thin illumination enables clear single-molecule imaging in cells", *Nature Methods*, vol. 5 (2), pp. 159-161, 2008.

* cited by examiner

DEVICE FOR IMAGING SAMPLE

The present application claims priority from PCT Patent Application No. PCT/EP2014/060891 filed on May 27, 2014, which claims priority from German Priority Application No. 10 2013 105 586.9 filed on May 30, 2013, the disclosures of which are incorporated herein by reference in their entirety.

FIELD OF THE INVENTION

The invention is directed to an apparatus for imaging a sample arranged in a first medium in an object plane. The apparatus comprises an optical transmission system which images the sample in the object plane in an intermediate image in an intermediate image plane, where the object plane and the intermediate image plane form an identical angle not equal to 90° with an optical axis of the transmission system, and the optical transmission system is constructed symmetrically from two subsystems with a plurality of lenses such that the imaging is carried out by the optical transmission system on a scale of 1:1. The apparatus further includes an optical imaging system having an objective whose optical axis is perpendicular to the intermediate image plane and which is focused on the intermediate image plane such that the object plane can be imaged on a detector without distortion.

An apparatus of this type is used particularly for analyzing biological samples when the sample is illuminated by a light sheet, the plane of which intersects the optical axis of detection at an angle not equal to zero. The light sheet typically forms a right angle with the detection direction which generally corresponds to the optical axis of the microscope objective. Spatial recordings of even thick samples can be made within a relatively brief period of time by this technique, also referred to as SPIM (selective plane illumination microscopy). A graphic, spatially extensive representation of the sample is made possible based on optical sections combined with a relative movement in a direction perpendicular to the section plane.

SPIM technique is preferably used in fluorescence microscopy, where it is accordingly also referred to as LSFM (light sheet fluorescence microscopy). The LSFM technique has a number of advantages over other established methods such as confocal laser scanning microscopy or two-photon microscopy. Since widefield detection is carried out, larger sample regions can be acquired. Although the resolution is somewhat lower than in confocal laser scanning microscopy, the LSFM technique can be used to analyze thicker samples because the penetration depth is greater. Further, this method has the least light stress on the samples, which reduces the risk of photobleaching of a sample because the sample is only illuminated by a thin light sheet at an angle to the detection direction not equal to zero.

Instead of using a purely static light sheet, a quasistatic light sheet can also be generated through fast scanning of the sample with a rotationally symmetrical light beam. The light sheet-type illumination is caused in that the rotationally symmetrical light beam undergoes a very fast relative movement with respect to the sample to be observed and is thus strung together over and over in a temporally consecutive manner. The integration time of the camera on whose sensor the sample is imaged is selected such that the scanning is concluded within the integration time.

SPIM technique has been described many times in the literature, for example, in DE 102 57 423 A1 and in WO 2004/0535558 A1 which is based on the latter. Methods and arrangements by which a particularly thin light sheet can be produced are described, for example, in the not-prior-published DE 10 2012 013 163.1.

In typical SPIM arrangements, the illumination is carried out via a lens system which is situated in the plane of the sample being illuminated. Accordingly, when observing from above, for example, the illumination must be carried out from the side. Therefore, conventional specimen techniques cannot be used. A further substantial disadvantage consists in that both the illumination objective and the observation objective must be arranged close together spatially so that a lens with a high numerical aperture, i.e., a lens which gathers light from a broad area, can be used for detection. At the same time, a light sheet must be generated. These mechanical restrictions can lead to a limiting of the numerical aperture and, therefore, of the resolution of the imaging system.

An arrangement which makes it possible to use the same objective for illumination with a light sheet and for detection of fluorescence coming from the sample is described in the article "Highly inclined thin illumination enables clear single-molecule imaging in cells", M. Tokunaga et al., Nature Methods 5 (2), pages 159-161, 2008. The illumination of the sample with a light sheet is carried out via a partial region of the objective that includes an edge region of this objective such that the illumination takes place under an angle diagonal to the optical axis of the objective. An opposite edge region of the objective is then used for detection so that, on the average, detection likewise takes place under an angle not equal to zero relative to the optical axis of the objective. Because of the limited numerical aperture of the object, this angle is generally less than 90°, which it commonly is otherwise in the SPIM technique. Further, the light sheet does not lie in the focal plane of the objective but rather at an angle diagonal thereto such that it intersects it only at one point. As a result, the slice through the sample illuminated by the light sheet also does not lie in the image plane in the image but rather only intersects it at one point and is accordingly out of focus in wide areas. Tilting the detector in such a way that the illuminated section of the sample coincides with the detector plane would considerably worsen the image quality, since the tilting of the detector relative to the optical axis would lead to the occurrence of spherical aberrations which are all the more noticeable the farther the illuminated sample regions lie outside of the focal plane or image plane.

This problem can be remedied by a construction such as that described, for example, in US2011/0261446 A1, which discloses a construction that replaces the imaging system of Tokunaga et al. by a transmission system. This transmission system comprises two imaging systems coupled to one another in a mirror-symmetrical manner. The two imaging systems are arranged mirror-symmetrically with respect to the optical elements thereof, where the mirror plane corresponds to the original image plane of the first imaging system, i.e., in which the illuminated region of the sample obliquely intersects the image plane in the image. The magnification of the transmission system is selected so as to correspond to the ratio of the refractive index of a first medium in which the sample is located to the refractive index of a second medium in which the intermediate image is located.

Insofar as no immersion media are used, the optical components of the two imaging subsystems can be selected identically, but are arranged in a mirror-inverted manner so that imaging takes place on the scale of 1:1. If one of the two subsystems is designed as an immersion system, i.e., when the optical element closest to the sample is located in an immersion medium, magnifications corresponding to the ratio of the refractive index of the object-side medium to the refractive index of an image-side medium or immersion medium are to be selected according to US2011/0261446 A1.

Accordingly, by means of the optical transmission system—which is symmetrical provided that no immersion media are used—the object plane is imaged in an intermediate image in an intermediate image plane, and the intermediate image plane again coincides with the light sheet plane such that the object plane is displayed without distortion and without magnification with respect to the intermediate image plane.

Now in order to obtain a magnified display of the sample in the object plane, US2011/0261446 A1 provides an optical imaging system which is configured as a microscope and which has an objective whose optical axis is perpendicular to the intermediate image plane. Further, when focusing on the intermediate image plane, the focal planes of the transmission system and imaging system intersect in the center of the intermediate image. In this way, the sample can be imaged on the detector without distortion, i.e., free from aberrations, with a magnification depending on the microscope. The underlying principle is described, for example, in WO02008/078083 A1, according to which, using a system of this type, an object can be imaged depthwise in a certain volume region in an image plane perpendicular to the optical axis without coma and without spherical aberration.

A disadvantage in the arrangement described in US2011/0261446 A1 consists in the many lenses used for the optical transmission system, since each of the two subsystems is a microscope system with a tube lens. Therefore, the system in its entirety is bulky and, further, the large quantity of lenses leads to a light loss which is disadvantageously discernible. A further problem arises due to the fact that the object plane is tilted such that many object points which are to be imaged are not in focus. Usually, however, microscope lenses cannot be corrected for regions that are so far outside of the plane of focus.

SUMMARY OF THE INVENTION

Therefore, it is the object of the invention to further develop an apparatus of the type described above such that these disadvantages are overcome. In particular, a compact, space-saving system is to be developed which makes do with as few lenses as possible and which, further, requires as little correction as possible for prevention of imaging aberrations.

This object is met in an apparatus of the type described above in that the two subsystems are constructed telecentrically and the optical transmission system is constructed symmetrically with respect to a pupil plane, where the object plane and the intermediate image plane satisfy the Scheimpflug condition, and the intermediate image lies in a second medium which has a refractive index that is virtually identical to that of the first medium. A compact construction which, in addition, requires little correction can be achieved in that the lens group of the subsystems which is arranged closest to the sample or intermediate image comprises at least one catadioptric assembly.

The construction of the optical transmission system with a catadioptric assembly offers a number of advantages over a system of lenses. For one, there is no need for special corrections of chromatic aberrations because the light is reflected instead of passing through a lens. Further, it is easier to apply Petzval corrections. Further, a catadioptric assembly makes it possible to construct the optical transmission system in an uncomplicated manner with telecentric subsystems and symmetrically with respect to a pupil plane such that, e.g., a pupil plane by means of which the numerical aperture can be controlled can be inserted into the plane of symmetry of the transmission system. In this area, the beam path can also be lengthened within a certain area allowing further optical elements to be accommodated. Also, a structured illumination can be generated in this way without a separate pupil imaging. The accessible pupil also makes it easier to generate an overview image with an object plane which can extend parallel to the surface of a coverslip, for example. Because the subsystems are telecentric, transmission can also take place correctly without appreciable chromatic aberrations in a broad area outside of the focal plane.

The object plane and intermediate image plane satisfy the Scheimpflug condition such that an angle $\beta'$ forming the normal of the intermediate image plane with the optical axis of the transmission system is uniquely defined by an angle $\beta$ forming the normal of the object plane with the optical axis of the transmission system and by the refractive indices of the two media and the magnification. In general:

$$\tan \beta' = \frac{n'}{n} M \tan \beta$$

When, in a preferred manner, the two media have identical refractive indices n', n, or at least virtually identical refractive indices, and a magnification of 1 is selected with imaging on the scale of 1:1, the two angles are accordingly identical or virtually identical, which simplifies the construction of the optical imaging system relative to the optical transmission system. Also, when the refractive indices are virtually identical, the angles can be equated in good approximation.

In the solution according to the invention, not only are the subsystems of the transmission optics constructed symmetrically, but the refractive indices of any immersion media that may be used and of media in which the sample and intermediate image are located are also virtually identical. Coverslips, if utilized, are identically constructed preferably in the object region as well as in the intermediate image region, i.e., are made of the same material and have the same thickness. It is also possible to use coverslips of different materials if the refractive indices thereof are virtually identical. Therefore, the intermediate image lies in a second medium which has a refractive index that is virtually identical to that of the first medium. Thanks in no small part to this step, the occurrence of aberrations such as coma and lateral color quenching can be prevented by this symmetrical construction because these asymmetrical aberrations of the two subsystems cancel each other out. In conjunction with the media, the transmission system allows within a defined volume region a true-to-scale imaging in depth dimension as well as in lateral extension in a ratio of 1:1, a faithful imaging of the object volume without coma in the lateral extension perpendicular to the optical axis, and free from spherical aberrations depthwise such that an object plane extending obliquely relative to the optical axis is also imaged true to scale and without the above-mentioned aberrations in the intermediate image plane.

While the apparatus described above is generally suitable for imaging oblique object planes and, owing to its compact construction, can be used therein in a simple manner, its special advantage consists in that it can be used in conjunction with the SPIM technique in which the detection direction and the illumination direction form an angle that is not equal to zero, and the illumination takes place in the illumination direction with a light sheet. To this end, the apparatus preferably has means for coupling in illumination light for illuminating the sample with a light sheet, and the light sheet plane lies substantially in the object plane and at an angle to the detection direction that is not equal to zero.

A first possibility for configuring the means of coupling in illumination light consists in providing an illumination device which couples the illumination light into the beam path via the second medium in the intermediate image plane, and the illumination of the intermediate image plane with a light sheet takes place in this plane. However, this requires that the illumination optics and the optical imaging system which is focused on the intermediate image plane be adapted in an exact manner with respect to construction, since both are located on the same side of the transmission optics, which makes it difficult to use high numerical apertures. However, the advantage of this arrangement over coupling in illumination light directly at the sample location consists precisely in that the illumination does not take place at the sample location, which enables a simpler construction overall and expands the possibilities for use, since a specific configuration of the sample chamber need not be taken into account.

Because of the symmetrical construction with respect to the pupil plane, in a particularly preferred embodiment of the apparatus, another possibility can also be realized for coupling in illumination light, in which the illumination optics and the optical imaging system for detection do not conflict with each other with respect to space. In this configuration, the means for coupling in illumination light comprise a beamsplitter arranged in a pupil plane between the two subsystems. This configuration can be used to particular advantage when the wavelengths of the illumination light differ from the wavelengths to be detected, which is generally the case in fluorescence microscopy applications, for example. Other optical elements can also be used instead of beamsplitters insofar as they deflect the coupled-in light in direction of the sample and unrestrictedly pass the light coming from the sample in the corresponding region of the apparatus. The illumination light is only coupled into the portion of the optical transmission system incident on the sample at an angle other than that of the light to be detected which is coming from the sample. Accordingly, the angular area in which the illumination light is emitted differs from the angular area at which the light to be detected is emitted from the sample with respect to the optical axis in each instance. This is true for all of the embodiments.

In order to achieve the highest possible numerical aperture, it is advantageous when the optical transmission system is in contact with the first medium and the second medium such that the first medium and second medium act as immersion media. Water can be used as first medium, for example. This choice is also possible for the second medium in principle, but is disadvantageous inasmuch as the optical imaging system for detection and possibly also the illumination device would then also have to be configured correspondingly as immersion optics. Therefore, instead of water, an amorphous fluoropolymer, e.g., CYTOP®, which has a refractive index substantially corresponding to that of water, is advantageously used for the second medium. At a wavelength of $\lambda_d$=578.56 nm, the refractive index of water is 1.33 and that of the above-mentioned fluoropolymer is 1.34 which is considered virtually identical within the meaning of the invention. CYTOP® can also be used as the first medium. The fluoropolymer can also be used in place of a coverslip, should one be provided, so that it is possible to configure the transmission system with higher tolerances because of the virtually identical refractive indices.

Another embodiment provides for the use of sample carriers on both sides of the transmission system. If a sample chamber is used on the object side, it is sufficient that a plate of identical material or of a material with a virtually identical refractive index and of identical thickness as the corresponding sample chamber wall is used on the intermediate image side to achieve the optical symmetry. In this case, immersion media need not be used, but of course may be used, in which case the same immersion medium, e.g., water or oil, is preferably used on both sides of the transmission system.

For example, any materials suitable for sustaining organic samples over longer or shorter time periods, e.g., water, aqueous solutions or gels, with the exception of air, may be used as first medium.

There are various possibilities for implementing the catadioptric assembly. However, for purposes of a compact construction, it is advantageous when the catadioptric assembly includes the following elements: (i) a plano-convex lens or lens group with a convex surface and a flat surface which faces the object plane or intermediate image plane and is reflection-coated toward the inner side, and (ii) a mirror element which is arranged opposite the convex surface of the lens or lens group and which has a concave mirror surface which reflects light coming from the plano-convex lens or lens group. In the plano-convex lens or lens group and in the mirror element, a region which encloses the optical axis is exempted from reflective coating so that light can pass through the mirror and be transmitted in this region.

The catadioptric assembly can have, for example, an individual plano-convex lens or a lens group having two or more lenses cemented together. The convex surface of the plano-convex lens or lens group can be aspherical. The mirror element can also be designed as a Mangin mirror. Constructions of this kind are set forth, for example, in the subclaims and are also described referring to the following drawings.

It will be appreciated that the features mentioned above and those to be described hereinafter can be used not only in the indicated combinations but also in other combinations or individually without departing from the scope of the present invention.

The invention will be described more fully in the following by way of example with reference to the drawings which also show key features of the invention. The drawings show:

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
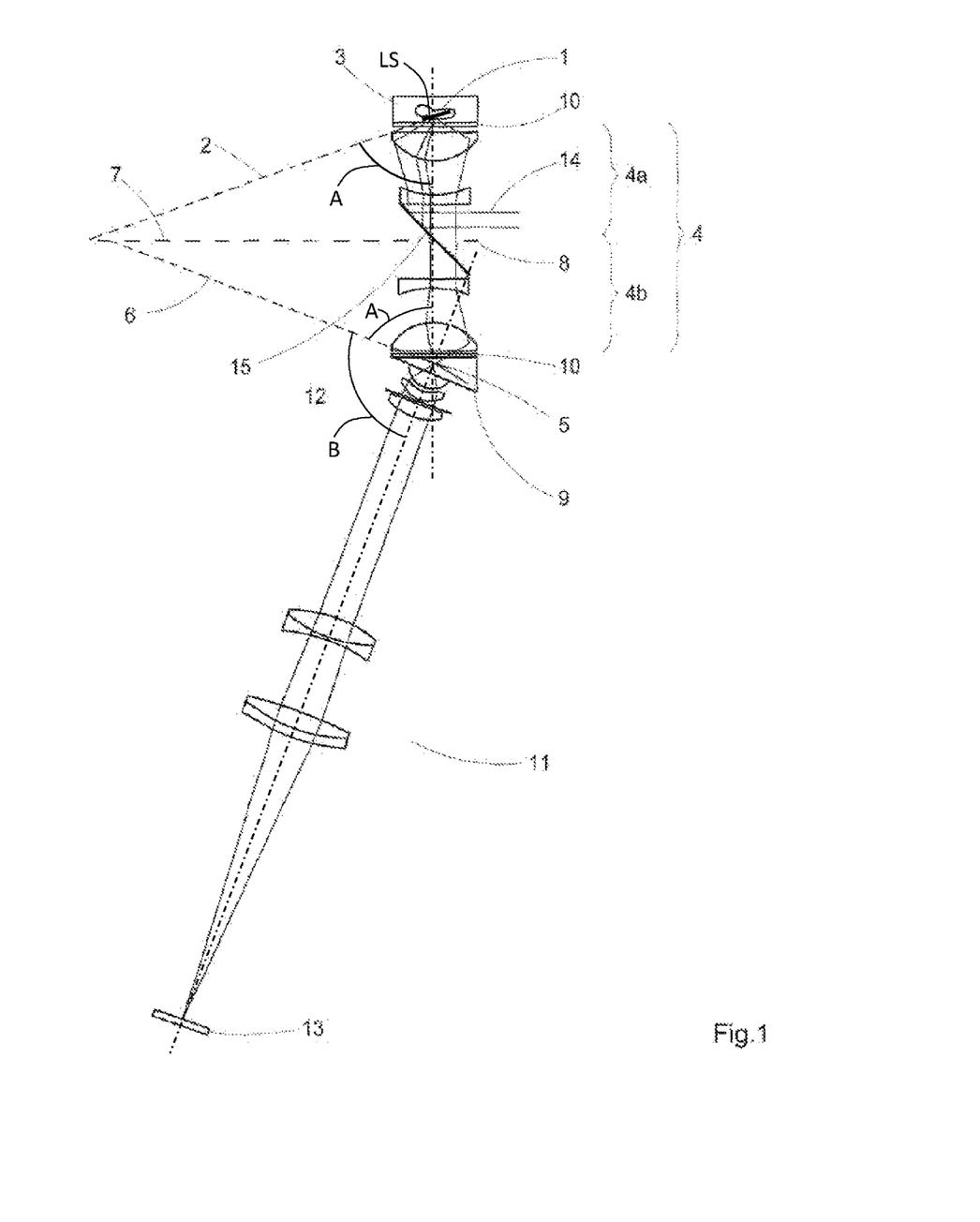
FIG. 1 the basic construction of an apparatus for imaging a sample with an optical transmission system and an optical imaging system.

FIG. 1 shows first the basic construction of an apparatus for imaging a sample 1 arranged in an object plane 2 in a first medium 3. The first medium 3 can be water or an aqueous solution, for example. The apparatus includes an optical transmission system 4 which images the sample 1 in the object plane 2 in an intermediate image 5 in an intermediate image plane 6. The object plane 2 and the intermediate image plane 6, respectively, form an angle A not equal to 90° with an optical axis of the optical transmission system 4, the respective angles A preferably being identical. The optical transmission system 4 comprises two subsystems, i.e., an object-side subsystem 4a and an intermediate image-side subsystem 4b, each having a plurality of lenses, and is constructed symmetrically with respect to a symmetry plane 7 so that the imaging is carried out on a scale of 1:1. The object plane 2, intermediate image plane 6 and symmetry plane 7, which may also be called the objective plane, intersect in a straight line such that the Scheimpflug condition is satisfied. The construction of the optical transmission system is symmetrical with respect to a pupil plane, i.e., the symmetry plane 7 corresponds to a pupil plane. An optional, advantageously controllable pupil diaphragm 8 is arranged in this pupil plane in the construction shown in FIG. 1. In order to achieve a compact construction and minimize imaging aberrations, the lens group of the subsystems 4a and 4b which is arranged closest to the sample 1 or intermediate image has at least one catadioptric assembly in each instance. In order to ensure that the imaging is actually carried out on a scale of 1:1 and to extensively eliminate possible imaging aberrations, the transmission system 4 is constructed in such a way that the intermediate image 5 lies in a second medium 9 during imaging of the sample 1, and the second medium 9 has a refractive index that is virtually identical to that of the first medium 3. For example, if the first medium 3 is water and if the transmission system 4 is configured as an immersion system such that, for example, it is immersed directly in the sample chamber with water, then the second subsystem 4b is also configured as an immersion system and the intermediate image 5 then lies in the second medium 9 which has a refractive index virtually identical to that of water. Of course, the second medium 9 and the first medium 3 can also be identical. However, CYTOP® can also be used as second medium instead of water, which facilitates construction, since it is not a fluid material. Other media which are more solid compared to water but which have virtually identical refractive indices can also be used. Certainly, it is also possible to place the sample 1 in an aqueous solution on a sample carrier 10 as is shown here for the sample-side subsystem 4a of the optical transmission system 4. Correspondingly, a sample carrier 10 or a corresponding optical, usually plane-parallel, element of the same material and of the same thickness as the sample carrier 10 is likewise arranged on the intermediate image side of the transmission system 4. Again, the transmission system 4 can be configured as an immersion system, and an immersion liquid is then located between the outer lens of the catadioptric system and the sample carrier 10. In this case, oil, for example, can also be used as immersion liquid, although this is not particularly suitable as first medium 3 because oil cannot be used to conserve living samples in particular.

Facing the intermediate image plane 6 is an optical imaging system 11 with an objective 12 whose optical axis is perpendicular to the intermediate image plane 6 and an angle B, and which is focused on the intermediate image plane 6. In this way, the object plane 2 can be imaged overall on a detector 13 without distortion. The detector 13 can be, for example, the CCD chip or CMOS chip of a camera. Observation by means of an eyepiece or on a screen is, of course, also conceivable.

The two subsystems 4a and 4b are telecentric systems, and the transmission system 4 as overall system is an afocal system so that the intermediate image is imaged without aberrations in a large area that is not focused. This is necessary because the object plane 2 is tilted relative to the optical axis such that a region of the volume is actually imaged on the detector 13.

Beyond this, the use of catadioptric assemblies for the subsystems 4a, 4b offers the advantage that the pupil which forms the region between the two subsystems 4a and 4b is easily accessible. In this way, additional optical elements, like the pupil diaphragm 8 already mentioned, can be introduced into the beam path.

The apparatus described above can be used particularly well in conjunction with the SPIM technique as it offers a number of options for coupling the illumination light into the beam path of the transmission system 4 for illuminating the sample 1 with a light sheet as is required in this method. The light sheet plane LS lies substantially in the object plane and at an angle not equal to zero relative to the detection direction. In principle, combining with a typical SPIM construction in which the illumination is effected through a separate illumination objective in the region of the sample or sample chamber is also possible.

One of the possibilities for coupling illumination light 14 into the transmission system 4 is also shown in FIG. 1. However, this is only one of a number of possibilities. For example, combining with conventional separate illumination optics having their own illumination objective is also possible. The means for coupling in illumination light 14 shown in FIG. 1 include a beamsplitter 15 arranged in a pupil plane between the two subsystems 4a and 4b. The arrangement of the beamsplitter 15 in the pupil plane is easily possible because the beam path can be lengthened to a certain extent at this location between the two subsystems 4a and 4b so that the beamsplitter 15 can be arranged in the pupil plane without difficulty. In FIG. 1, the beamsplitter 15 is arranged in the symmetry plane 7. This is not absolutely necessary; it can also be associated directly with one of the two subsystems 4a or 4b. For this purpose, the beamsplitter 15 must be configured such that it passes light to be detected, which is not problematic for fluorescence microscopy applications because the wavelengths of illumination light 14 differ from those of light to be detected in that case. It can be seen in FIG. 1 that the left-hand portion of subsystem 4a is used for the illumination beam path, while the right-hand portion of subsystem 4a is used for detection. Because of this spatial separation of detection beam path and illumination beam path which is necessary for implementing SPIM observation with an individual optical system in the area of the sample, an element which is one half the size of the beamsplitter 15 and which leaves open the area on the right-hand side can be used instead of the beamsplitter 15 which takes up the entire pupil plane. In this way, slight light losses which can occur with the beamsplitter 15 can be prevented, which may be advantageous in case of weak fluorescence signals.

Figure 2:
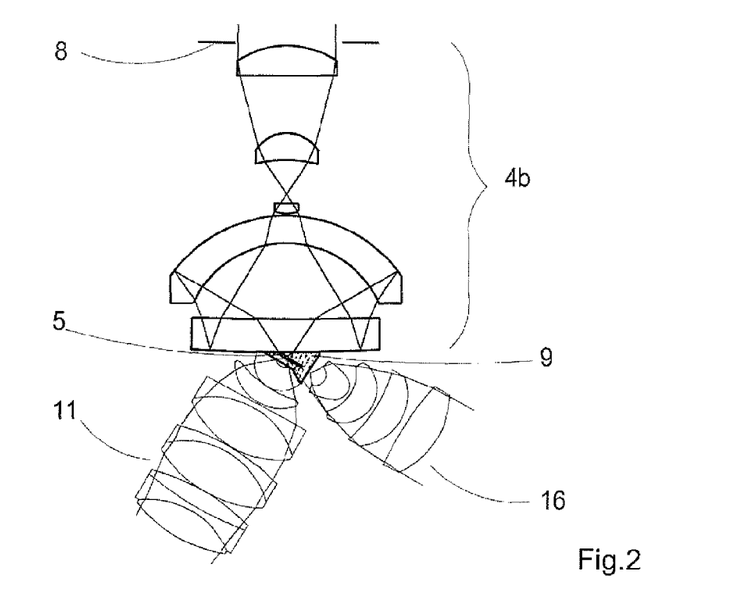
FIG. 2 an optical transmission system with another embodiment for coupling in illumination light.

A further possibility for coupling illumination light 14 into the beam path of the transmission system 4 is shown in FIG. 2, where, instead of showing the transmission system 4 in its entirety, only the intermediate image side subsystem 4b is shown schematically. The optical elements shown merely serve to illustrate the basic beam path. The illumination device 16 shown here is arranged on the side of the intermediate image 5 and is configured to introduce the illumination light 14 via the second medium 9 in the intermediate image plane 6 into the beam path. The illumination of the intermediate image plane 6 is already carried out with a light sheet in this plane. This light sheet is then correspondingly transmitted into the object plane 2, since the transmission system 4 functions in both directions.

The intermediate image side subsystem 4b shown in FIG. 2 directly contacts the second medium 9 which accordingly acts as immersion medium. The first medium 3 directly contacts the corresponding optical element of the object-side subsystem 4a and acts as immersion medium. Accordingly, a special sample holder is omitted in this construction. If the first medium 3 is water, for example, the transmission system can be introduced into the corresponding sample chamber from above. Application from the side or from below is also possible via special connections at the sample chamber. For example, if water is used as first medium 3, water can also be used as second medium 9. However, instead of a liquid medium it is particularly advantageous to use a solid or amorphous medium, for example, an amorphous fluoropolymer such as that marketed by the firm BELLEX International Corporation under the tradename CYTOP®. Owing to its consistency, this material need not be stored separately in a vessel, which is a great advantage for connecting the optical imaging system 11 and, as the case may be, the illumination device 16 shown in FIG. 2 because, otherwise, the optical imaging system 11 and the illumination device 16 would also have to be configured as immersion systems, which, of course, is also possible.

Evidently, both the first medium 3 and the second medium 9 can also be replaced by a sample carrier 10 or coverslip or a corresponding element on the intermediate image side. In this case, the transmission system 4 need not necessarily be configured as an immersion system. However, configuration as immersion system is advantageous for achieving a high numerical aperture. In the apparatus shown in FIG. 2, the transmission system 4 can have, for example, a numerical aperture of 1.31, the optical imaging system 11 can have a numerical aperture of 1.0, and the illumination device 16 can have a numerical aperture of 0.5. Since it serves only for imaging and not for illumination, the optical imaging system 11 in this case no longer needs an extremely high numerical aperture, which facilitates the optical design with respect to the selection and assembly of components for a well-corrected imaging.

The catadioptric assembly can be configured in different ways. The rest of the elements of the transmission system 4 are configured depending on the configuration of this assembly. In order to make the spatial length dimension of the transmission system 4 more compact along the optical axis, the catadioptric assembly comprises, for example, a plano-convex lens or lens group and a mirror element. The plano-convex lens or lens group has a flat surface which faces the object plane 2 or intermediate image plane 6 and is reflection-coated toward the inner side. A region which encloses the optical axis is exempted from the reflection-coating in order to pass light. The region must be large enough for sufficient light to enter the transmission system 4 along the detection direction through this uncoated region and, further, for illumination light at an angle of preferably 90° relative to the detection direction for optimal illumination with a light sheet. A convex surface is arranged opposite the flat surface, and the mirror element is in turn arranged opposite this convex surface of the lens or lens group. The mirror surface of this mirror element is concave and it reflects light coming from the plano-convex lens or lens group. There is likewise a region in this mirror element that encloses the optical axis and is exempted from the reflection-coating in order to pass light. The beam path is designed in such a way that light enters through the uncoated region at an angle in the region of the detection direction, initially passes through the plano-convex lens, exits at the convex surface and is reflected back at the mirror surface of the mirror element to the plano-convex lens. After passing anew through the convex surface of the plano-convex lens, the beam is reflected at the reflective flat surface in the direction of the region of the mirror element that is exempted from reflective coating in order to pass light. This region can be formed as an aperture, and a corresponding lens or lens group can also be inserted into this aperture.

The transmission system 4 can be implemented in various way using these two elements: the plano-convex lens or lens group and the mirror element.

For example, each of the two subsystems 4a and 4b can have the system data indicated in the following Table 1.

TABLE 1

Figure 3:
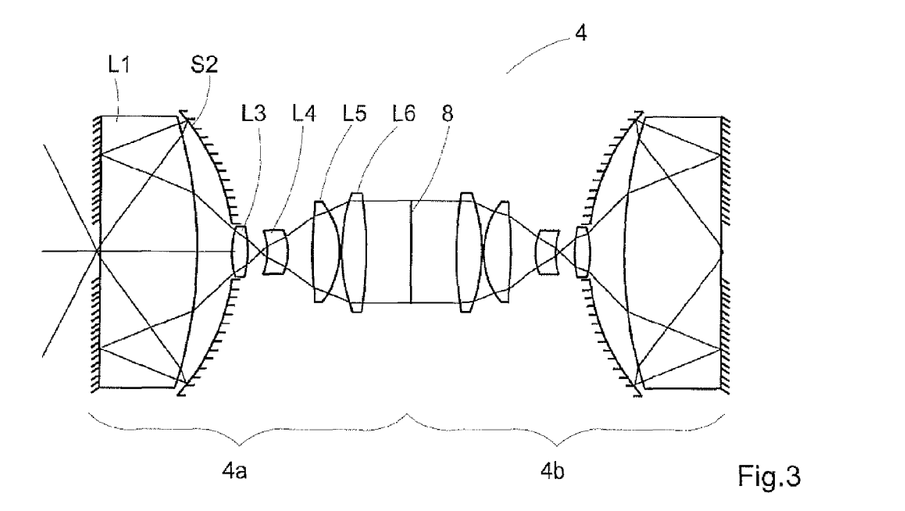
FIG. 3 a first specific embodiment of the optical transmission system.

| Lens | Surface | Radius [mm] | Thickness [mm]/ Air Gap [mm] | $n_d$ | $v_d$ |
|------|---------|-------------|------------------------------|-------|-------|
| L1   | 1       | flat        | 17.56                        | 1.52  | 64.17 |
|      | 2       | −59.77      | 7.22                         |       |       |
| S2   | 3       | −29.95      | 1.00                         |       |       |
| L3   | 4       | 784.92      | 3.35                         | 1.59  | 64.27 |
|      | 5       | −21.53      | 2.56                         |       |       |
| L4   | 6       | −8.81       | 4.39                         | 1.65  | 33.85 |
|      | 7       | −8.21       | 3.76                         |       |       |
| L5   | 8       | 189.42      | 3.50                         | 1.52  | 64.17 |
|      | 9       | −15.81      | 0.50                         |       |       |
| L6   | 10      | 21.29       | 4.00                         | 1.52  | 64.17 |
|      | 11      | −65.47      |                              |       |       |

Each of the subsystems has lenses L1, L3, L4, L5 and L6 and a mirror element S2; surfaces 1 and 3 are reflection-coated. The refractive index $n_d$ and the Abbe number $v_d$ relate to a wavelength of $\lambda_d$=578.56 nm. A transmission system with these system data is shown by way of example in FIG. 3. Accordingly, in this case the catadioptric assembly has lens L1 and mirror element S2. The working distance is 0.5 mm in this case. A material which has a refractive index $n_d$=1.33 and an Abbe number $v_d$=55.74, for example, water or a fluoropolymer such as CYTOP® which has a refractive index of 1.34, is preferably used as first medium and second medium. The system described in Table 1 is also, and particularly, suitable for use in immersion environments.

Figure 4:
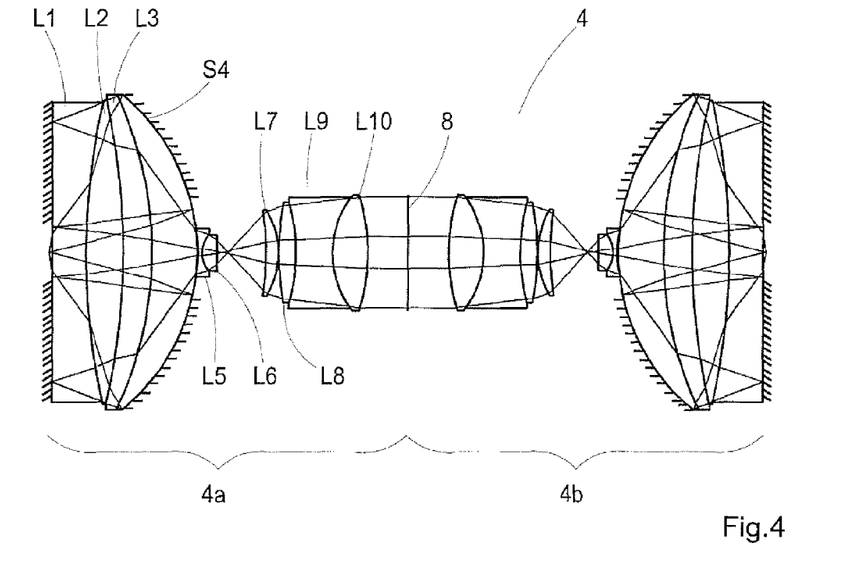
FIG. 4 a second specific embodiment of the optical transmission system.

Another example for implementing the transmission system 4 is shown in FIG. 4. Each of the two subsystems 4a and 4b of the transmission system 4 shown in FIG. 4 has the following system data.

TABLE 2

| Lens | Surface | Radius [mm] | Thickness [mm]/ Air Gap [mm] | $n_d$ | $v_d$ |
|------|---------|-------------|------------------------------|-------|-------|
| L1   | 1       | flat        | 7.22                         | 1.64  | 42.41 |
| L2   | 2       | 122.40      | 8.53                         | 1.46  | 67.87 |
| L3   | 3       | −130.00     | 6.16                         | 1.82  | 46.62 |
|      | 4       | −74.26      | 10.49                        |       |       |
| S4   | 5       | −38.74      | 0.10                         |       |       |
| L5   | 6       | −16.21      | 1.00                         | 1.44  | 94.93 |
| L6   | 7       | 6.19        | 3.28                         | 1.64  | 42.21 |
|      | 8       | −85.87      | 10.80                        |       |       |
| L7   | 9       | −174.59     | 3.04                         | 1.74  | 32.26 |
|      | 10      | −14.94      | 0.10                         |       |       |
| L8   | 11      | 42.60       | 3.40                         | 1.61  | 56.65 |
| L9   | 12      | −46.09      | 8.71                         | 1.88  | 40.76 |
| L10  | 13      | 17.72       | 7.67                         | 1.82  | 46.62 |
|      | 14      | −37.45      |                              |       |       |

Figure 5:
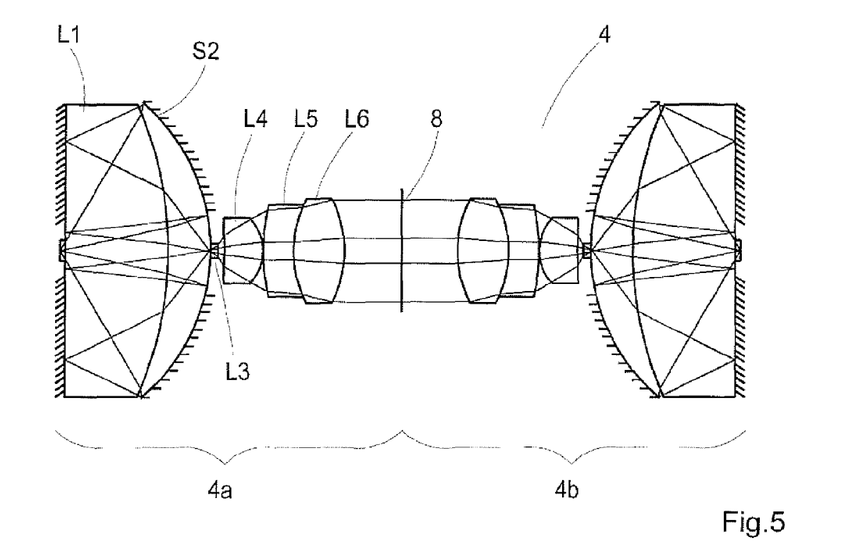
FIG. 5 a third specific embodiment of the optical transmission system.

In this case, each of the subsystems 4a and 4b has lenses L1, L2, L3, L5, L6, L7, L8, L9, L10 and a mirror element S4. Lenses L1, L2 and L3 are cemented together. Lenses L8, L9 and L10 are likewise cemented together. They form lens groups in each instance. In each of the subsystems, surfaces 1 and 5 are reflection-coated which is denoted in both FIG. 4 and FIG. 3 by the shading. This configuration can be used in particular with a coverslip having the refractive index $n_d$=1.52 and an Abbe number $v_d$=59.48, in which case the coverslip preferably has a thickness of 0.17 mm. Water is again preferably used as first medium and second medium, and the working distance from the object plane—without the coverslip—is 0.4 mm, i.e., the thickness of the water layer is 0.4 mm. A fluoropolymer can also be used, for example, instead of water, as second medium on the intermediate image side In a further configuration of the transmission system 4, the convex surface of the plano-convex lens or lens group is aspherically shaped. In case of a lens group, this means the surface located farthest from the object. An example of a transmission system 4 of this type is shown in FIG. 5. It has the following system data from Table 3:

TABLE 3

| Lens | Surface | Radius [mm] | Thickness [mm]/ Air Gap [mm] | $n_d$ | $v_d$ |
|------|---------|-------------|------------------------------|-------|-------|
| L1   | 1       | flat        | 16.60                        | 1.52  | 64.17 |
|      | 2       | −51.89      | 6.85                         |       |       |
| S2   | 3       | −27.43      | 0.00                         |       |       |
| L3   | 4       | −95.19      | 1.00                         | 1.52  | 64.17 |
|      | 5       | 13.07       | 1.00                         |       |       |
| L4   | 6       | −23.51      | 6.17                         | 1.69  | 31.18 |
|      | 7       | −6.94       | 0.10                         |       |       |
| L5   | 8       | 26.32       | 5.00                         | 1.69  | 31.18 |
| L6   | 9       | 15.23       | 8.00                         | 1.52  | 64.17 |
|      | 10      | −14.45      |                              |       |       |

In this case, the convex surface 2 of the plano-convex lens is aspherically shaped. The aspherically shaped surface, in this instance a rotationally symmetrical conic asphere, is described by the following relationship $$f(h) = \frac{\rho h^2}{1+\sqrt{1-(1+K)\cdot(\rho h)^2}} + \sum_{i=2}^{N} c_{2i} h^{2i}$$

K is the conic constant, i and N are natural numbers, and $c_{2i}$ is the coefficient of a polynomial in h. R denotes the radius of an imaginary conic surface at the vertex of this surface, i.e., the distance from the vertex to the closest focal point. Both the vertex and the focal points of the conic surface lie on the optical axis. The coefficients of conic constant K and radius R are determined by iteration. The radius of surface 2 in Table 3 denotes the spherical base radius in closest vicinity to the optical axis, i.e., for small h, and corresponds to $\rho$.

Further, in the example shown in FIG. 5, lenses L5 and L6 form a lens group and are cemented together. This configuration can also be used particularly with a coverslip having refractive index $n_d$=1.52 and Abbe number $v_d$=59.48, the coverslip preferably having a thickness of 0.17 mm. Water is again preferably used as first medium and second medium, and the working distance, i.e., the thickness of the water layer, is 0.4 mm. When the selected conic constant is K=0 and with a conventional lens height of approximately 30 mm, the following coefficients of the polynomial in h to i=8 result for these parameters and the parameters indicated in Table 3: $c_4$=−8.9311·10$^{-7}$, $c_6$=−1.4858·10$^{-9}$, $c_8$=−2.1550·10$^{-11}$, $c_{10}$=−1.1551·10$^{-13}$, $c_{12}$=−3.6392·10$^{-16}$, $c_{14}$=−5.7753·10$^{-19}$ and $c_{16}$=−3.6408·10$^{-22}$. Fluoropolymers can also be taken into consideration as coverslip and/or media.

Figure 6:
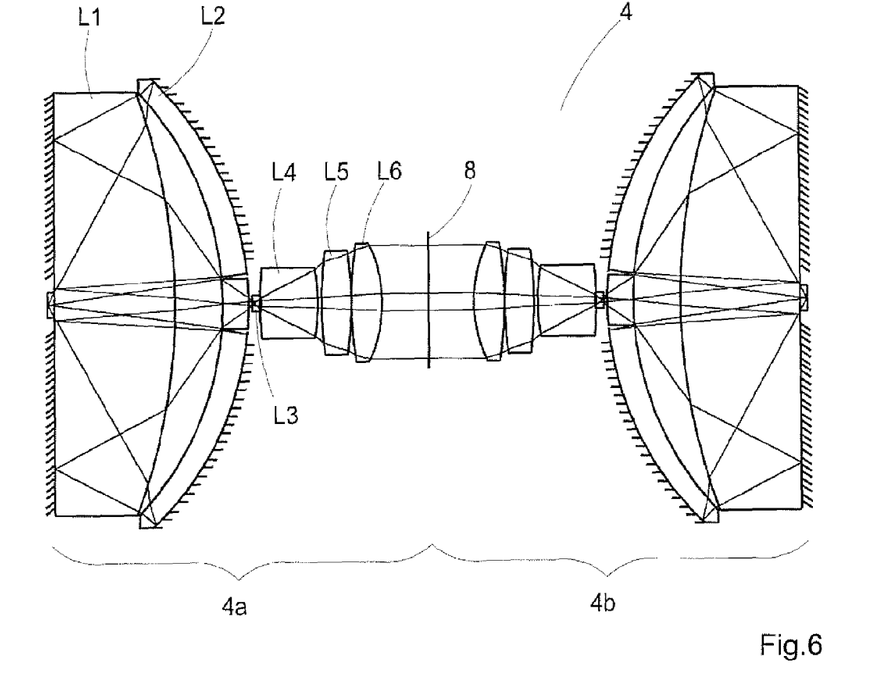
FIG. 6 a fourth specific embodiment of the optical transmission system.

In a further configuration of the transmission system, the mirror element can also be configured as a Mangin mirror. An example for this is shown in FIG. 6. It has the following system data from Table 4:

TABLE 4

| Lens | Surface | Radius [mm] | Thickness [mm]/ Air Gap [mm] | $n_d$ | $v_d$ |
|------|---------|-------------|------------------------------|-------|-------|
| L1   | 1       | flat        | 15.98                        | 1.52  | 64.17 |
|      | 2       | −62.72      | 6.23                         |       |       |
| L2   | 3       | −32.45      | 3.50                         | 1.52  | 64.17 |
|      | 4       | −31.64      | 0.53                         |       |       |
| L3   | 5       | −10.68      | 1.00                         | 1.52  | 64.17 |
|      | 6       | −1.90       | 0.10                         |       |       |
| L4   | 7       | −3.44       | 7.31                         | 1.69  | 31.18 |
|      | 8       | −19.46      | 0.54                         |       |       |
| L5   | 9       | 56.66       | 3.92                         | 1.69  | 31.18 |
|      | 10      | −39.96      | 0.10                         |       |       |
| L6   | 11      | 24.67       | 4.00                         | 1.52  | 64.17 |
|      | 12      | −14.04      |                              |       |       |

Each of the subsystems 4a, 4b has lenses L1, L2, L3, L4, L5 and L6. Lens L2 is configured as a Mangin mirror, i.e., one side of this lens—with the exception of the region around the optical axis—is reflection-coated. This configuration can be used in particular with a coverslip having the refractive index $n_d$=1.52 and an Abbe number $v_d$=59.48, in which case the coverslip preferably has a thickness of 0.17 mm. Again preferably water or a fluoropolymer is used as first medium and second medium, and the working distance, i.e., the thickness of the water layer, is 0.4 mm. The fluoropolymer can also be used instead of a coverslip.

Owing to the use of catadioptric elements, the optical transmission systems described above make possible a sharp reduction in the length of the construction of an apparatus for imaging a sample, particularly in conjunction with SPIM applications. Since the intermediate image and the actual object are disposed in media with approximately identical refractive indices, the out-of-focus volume area is imaged virtually without optical aberrations so that even oblique object planes located in a large area outside of the focus can be imaged correctly.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claim.

LIST OF REFERENCE CHARACTERS

1 sample
2 object plane
3 first medium
4 optical transmission system
4a, 4b subsystem
5 intermediate image
6 intermediate image plane
7 symmetry plane
8 pupil diaphragm
9 second medium
10 sample carrier
11 optical imaging system
12 objective
13 detector
14 illumination light
15 beamsplitter
16 illumination device
L1-L10 lenses
S2, S4 mirror elements

The invention claimed is:

1. An apparatus for imaging a sample arranged in a first medium in an object plane, said apparatus comprising:
an optical transmission system which comprises two subsystems constructed telecentrically, and which images the sample in the object plane in an intermediate image in an intermediate image plane, wherein each of the object plane and the intermediate image plane forms an angle not equal to 90° with an optical axis of the transmission system;
an optical imaging system comprising an objective with an optical axis that is perpendicular to the intermediate image plane, the objective being focused on the intermediate image plane so as to image the intermediate image on a detector without distortion; and
a coupler configured to couple an illumination light into a beam path of the transmission system for illuminating the sample with a light sheet, wherein the light sheet extends along a plane that lies substantially in the object plane at an angle to a detection direction that is not equal to zero;
wherein the two subsystems of the optical transmission system comprise a plurality of lenses;
wherein the optical transmission system is constructed symmetrically with respect to a symmetry plane from the two subsystems so that the imaging is carried out by the optical transmission system on a scale of 1:1;
wherein the optical transmission system is also constructed symmetrically with respect to a pupil plane, the object plane, and the intermediate image plane to satisfy a Scheimpflug condition, whereby the symmetry plane corresponds to the pupil plane;
wherein the intermediate image lies in a second medium which has a refractive index that is virtually identical to that of the first medium;
wherein a lens group, of the plurality of lenses of the two subsystems, which is arranged closest to the sample or intermediate image comprises at least one catadioptric assembly; and
wherein the coupler comprise a beamsplitter arranged in the pupil plane between the two subsystems.

2. The apparatus according to claim 1;
wherein the coupler comprises an illumination device which couples the illumination light into a beam path via the second medium in the intermediate image plane, wherein the illumination of the intermediate image plane with the light sheet takes place in the intermediate image plane.

3. The apparatus according to claim 1;
wherein the optical transmission system is configured to be in contact with the first medium and the second medium, wherein the first medium and second medium act as immersion media.

4. The apparatus according claim 1;
wherein the first medium comprises water and the second medium, which has the refractive index that is virtually identical to that of the first medium, comprises an amorphous fluoropolymer.

5. The apparatus according to claim 1;
wherein the catadioptric assembly comprises:
a plano-convex lens or lens group with a convex surface and a flat surface which faces the object plane or intermediate image plane that is reflection-coated toward the inner side, wherein a region which encloses the optical axis is exempted from reflective coating so that light can pass through; and
a mirror element arranged opposite the convex surface of the lens or lens group having a concave mirror surface that is reflection-coated which reflects light coming from the plano-convex lens or lens group, wherein a region which encloses the optical axis is exempted from reflective coating so that light can pass through.

6. The apparatus according to claim 5;
wherein each of the subsystems has the following system data with lenses L1, L3, L4, L5, L6 and a mirror element S2, wherein surfaces 1 and 3 are reflection-coated, with refractive index $n_d$ and Abbe number $v_d$ at a wavelength of $\lambda_d$=578.56 nm:

| Lens | Surface | Radius [mm] | Thickness [mm]/ Air Gap [mm] | $n_d$ | $v_d$ |
|---|---|---|---|---|---|
| L1 | 1 | flat | 17.56 | 1.52 | 64.17 |
|  | 2 | −59.77 | 7.22 |  |  |
| S2 | 3 | −29.95 | 1.00 |  |  |
| L3 | 4 | 784.92 | 3.35 | 1.59 | 64.27 |
|  | 5 | −21.53 | 2.56 |  |  |
| L4 | 6 | −8.81 | 4.39 | 1.65 | 33.85 |
|  | 7 | −8.21 | 3.76 |  |  |
| L5 | 8 | 189.42 | 3.50 | 1.52 | 64.17 |
|  | 9 | −15.81 | 0.50 |  |  |
| L6 | 10 | 21.29 | 4.00 | 1.52 | 64.17 |
|  | 11 | −65.47. |  |  |  |

7. The apparatus according to claim 5;
wherein each of the optical subsystems has the following system data with lenses L1, L2, L3, L5, L6, L7, L8, L9, L10 and a mirror element S4, wherein lenses L1, L2 and L3 are cemented together and lenses L8, L9 and L10 are cemented together to form lens groups, and wherein surfaces 1 and 5 are reflection-coated, with refractive index $n_d$ and Abbe number $v_d$ at a wavelength of $\lambda_d$=578.56 nm:

| Lens | Surface | Radius [mm] | Thickness [mm]/ Air Gap [mm] | $n_d$ | $v_d$ |
|---|---|---|---|---|---|
| L1 | 1 | flat | 7.22 | 1.64 | 42.41 |
| L2 | 2 | 122.40 | 8.53 | 1.46 | 67.87 |
| L3 | 3 | −130.00 | 6.16 | 1.82 | 46.62 |
|  | 4 | −74.26 | 10.49 |  |  |
| S4 | 5 | −38.74 | 0.10 |  |  |
| L5 | 6 | −16.21 | 1.00 | 1.44 | 94.93 |
| L6 | 7 | 6.19 | 3.28 | 1.64 | 42.21 |
|  | 8 | −85.87 | 10.80 |  |  |
| L7 | 9 | −174.59 | 3.04 | 1.74 | 32.26 |
|  | 10 | −14.94 | 0.10 |  |  |
| L8 | 11 | 42.60 | 3.40 | 1.61 | 56.65 |
| L9 | 12 | −46.09 | 8.71 | 1.88 | 40.76 |
| L10 | 13 | 17.72 | 7.67 | 1.82 | 46.62 |
|  | 14 | −37.45. |  |  |  |

8. The apparatus according to claim 5;
wherein the convex surface of the plano-convex lens or lens group is aspherically shaped.

9. The apparatus according to claim 8;
wherein each of the optical subsystems has the following system data with lenses L1, L3, L4, L5, L6 and a mirror element S2, wherein lenses L5 and L6 form a lens group and are cemented together, with refractive index $n_d$ and Abbe number $v_d$ at a wavelength of $\lambda_d$=578.56 nm, wherein surface 2 is aspherically shaped:

| Lens | Surface | Radius [mm] | Thickness [mm]/ Air Gap [mm] | $n_d$ | $v_d$ |
|---|---|---|---|---|---|
| L1 | 1 | flat | 16.60 | 1.52 | 64.17 |
|  | 2 | −51.89 | 6.85 |  |  |
| S2 | 3 | −27.43 | 0.00 |  |  |

-continued

| Lens | Surface | Radius [mm] | Thickness [mm]/ Air Gap [mm] | $n_d$ | $v_d$ |
|---|---|---|---|---|---|
| L3 | 4 | −95.19 | 1.00 | 1.52 | 64.17 |
|  | 5 | 13.07 | 1.00 |  |  |
| L4 | 6 | −23.51 | 6.17 | 1.69 | 31.18 |
|  | 7 | −6.94 | 0.10 |  |  |
| L5 | 8 | 26.32 | 5.00 | 1.69 | 31.18 |
| L6 | 9 | 15.23 | 8.00 | 1.52 | 64.17 |
|  | 10 | −14.45. |  |  |  |

10. The apparatus according to claim 8;
wherein the mirror element is configured as a Mangin mirror.

11. The apparatus according to claim 5;
wherein the mirror element is configured as a Mangin mirror.

12. The apparatus according to claim 11;
wherein each of the optical subsystems has the following system data with lenses L1, L2, L3, L4, L5, L6, wherein lens L2 is the Mangin mirror, and wherein surfaces 1 and 4 are reflection-coated, with refractive index $n_d$ and Abbe number $v_d$ at a wavelength of $\lambda_d$=578.56 nm:

| Lens | Surface | Radius [mm] | Thickness [mm]/ Air Gap [mm] | $n_d$ | $v_d$ |
|---|---|---|---|---|---|
| L1 | 1 | flat | 15.98 | 1.52 | 64.17 |
|  | 2 | −62.72 | 6.23 |  |  |
| L2 | 3 | −32.45 | 3.50 | 1.52 | 64.17 |
|  | 4 | −31.64 | 0.53 |  |  |
| L3 | 5 | −10.68 | 1.00 | 1.52 | 64.17 |
|  | 6 | −1.90 | 0.10 |  |  |
| L4 | 7 | −3.44 | 7.31 | 1.69 | 31.18 |
|  | 8 | −19.46 | 0.54 |  |  |
| L5 | 9 | 56.66 | 3.92 | 1.69 | 31.18 |
|  | 10 | −39.96 | 0.10 |  |  |
| L6 | 11 | 24.67 | 4.00 | 1.52 | 64.17 |
|  | 12 | −14.04. |  |  |  |

\* \* \* \* \*